Aug. 25, 1959   M. P. WINTHER   2,900,847
CLUTCH PULSATOR MECHANISM
Filed June 16, 1954
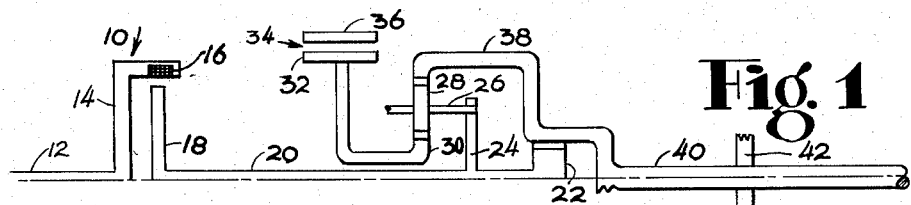
Fig. 1
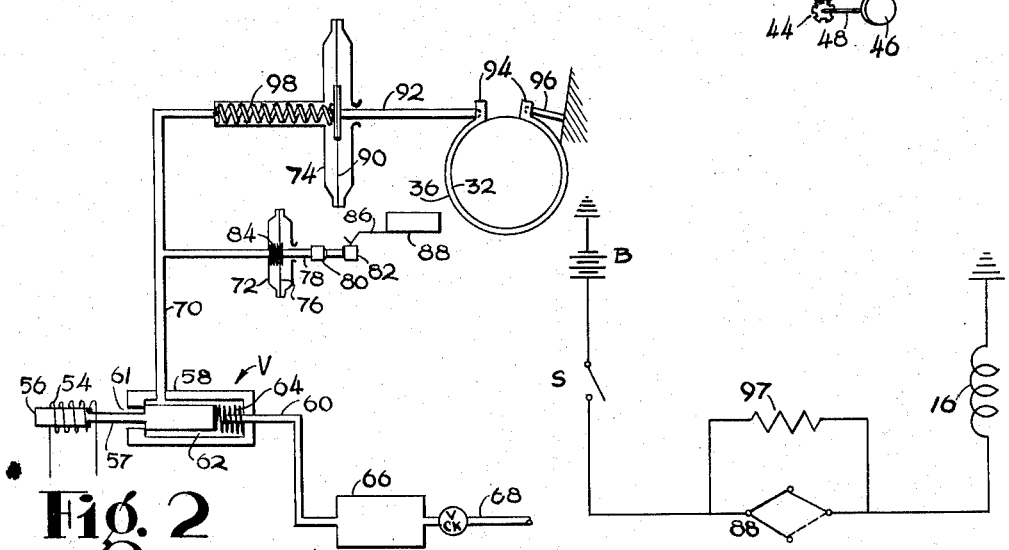
Fig. 2
Fig. 3
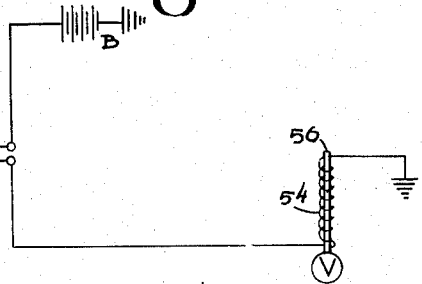
Fig. 4
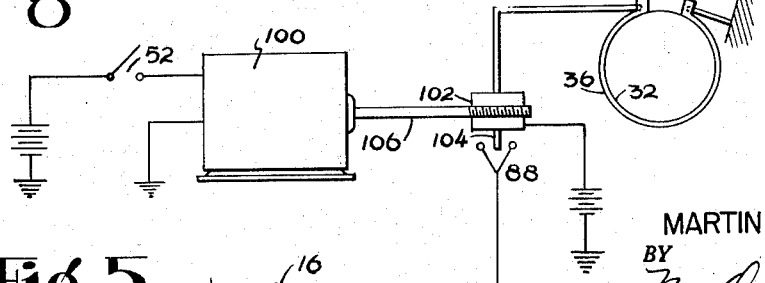
Fig. 5
INVENTOR.
MARTIN P. WINTHER
BY
*McDonald & Feagns*
ATTORNEYS United States Patent Office 2,900,847
Patented Aug. 25, 1959

2,900,847

CLUTCH PULSATOR MECHANISM

Martin P. Winther, Gates Mills, Ohio, assignor to Eaton Manufacturing Company, Cleveland, Ohio, a corporation of Ohio Application June 16, 1954, Serial No. 437,070

9 Claims. (Cl. 74—752)

The present invention relates to a clutch device and more particularly to a clutch pulsator device of a gear shift responsive nature.

Broadly, the invention comprehends the provision of an automatic clutch pulsator system comprising a magnetic clutch controllable in energization and coupling a power source to a load with a band or friction brake for controlling the gear ratio therebetween. The magnetic clutch is responsive in energization and deenergization to the shift point of the transmission to eliminate shock or lurch due to quick engagement of the band or friction brake.

An object of the present invention is the provision of a clutch pulsator device that is simple of design, easily serviced and adjusted and effective to provide a control of engagement between a power source and a load.

A further object of the present invention is the provision of a clutch pulsator device providing a control of engagement between an engine and driven wheels on automotive vehicles and the like.

A further object of the present invention is the provision of a clutch pulsator device responsive to transmission shift to control power drive circuit of an automotive system or the like.

Other objects and advantages of the invention will appear from the following detailed description thereof taken in connection with the accompanying drawings in which like reference numerals indicate like elements and in which:

Fig. 1 shows a power drive means of the type employed in the present invention;

Fig. 2 shows the vacuum circuit employed in the present invention;

Fig. 3 shows the electrical circuit for energizing a clutch employed in the present invention;

Fig. 4 shows a switch controlling energization of a transmission shift solenoid and responsive to a fly ball governor;

Fig. 5 shows an alternative embodiment of the present invention.

The present clutch pulsator system was devised for the purpose of providing a simple, effective arrangement to provide desirable conditions of operation such as are required in automotive vehicles and other powered mechanisms of the like sort, that is, engagement and disengagement of a clutch for the main drive mechanism without undesirable and unpleasant shock.

This result is achieved through the provision of a magnetic clutch in the power transmitting circuit which is deenergized or materially reduced in energization during periods of engagement or disengagement of a friction brake or band in the same power transmitting circuit. The friction brake or band may be engaged quickly and with force, and the shock will be eliminated since the magnetic clutch can be made to slip and disengage the power source during this time. After engagement of the band or friction brake, the magnetic clutch is again energized to re-engage the power means with the load. By its very nature the magnetic clutch is susceptible of smoother and more accurate control than the friction clutch resulting in shock free engagement and disengagement of the power means to the load.

In one embodiment of the present invention the power circuit comprises a power source driving the input member of a magnetic clutch through a shaft; the output member of the magnetic clutch driving the input shaft of a load through either a one-way overdriving clutch for a direct drive or through a planetary gearing arrangement having a band or friction brake for actuating the planetary gearing for drive at some speed greater or less than the input speed. The input shaft to the load is geared to a fly ball governor, and responsive to the governor is an electrical circuit controlling communication of a vacuum storage chamber with another vacuum chamber having a diaphragm therein responsive to changes in vacuum for actuating the engaging means of the band or friction brake. A second chamber in communication with the controlled vacuum storage chamber has a diaphragm responsive to vacuum changes simultaneously with the first diaphragm mentioned. Connected to the diaphragm of the second chamber is a cam member for actuating a switch arm to operate a switch and for opening and closing the circuit of an energizing coil for the magnetic clutch. The switch arm closes the switch at each extreme of the movement of the cams and opens the switch at an intermediate point of movement of the cams. As the output shaft attains sufficient speed when a shift in transmission gear ratio is appropriate, the fly ball governor closes the circuit for vacuum control. Communication of the diaphragmed vacuum chambers with the vacuum storage chamber is then terminated and atmosphere is admitted to the diaphragmed chambers. A spring actuates the diaphragms and in the friction brake diaphragm a lever connected to the diaphragm initiates movement for engagement of the band or friction brake. The power drive is then through a planetary set giving a new output speed. The magnetic clutch may be completely or only partially disengaged as the situation may demand, to provide an even or smooth shift. After a new gear ratio is provided, the pulsator switch is closed by actuation thereof by the second cam connected to the diaphragm plunger.

In another instance closure of a governor responsive switch energizes a motor circuit to simultaneously deenergize the magnetic clutch coil and to engage the band or friction brake before reenergization of the magnetic clutch coil.

Referring now to the drawings for a more detailed description of the invention, Fig. 1 shows a power drive arrangement having a shaft 12 delivering a torque from a power source and being connected to the input member 14 of a magnetic clutch 10 having an annular electromagnetic coil 16 mounted thereon. A shaft 20 is connected to a magnetic clutch output member 18 at one end thereof and is connected to over driving one-way clutch 22 at the other end. Also connected to shaft 20 intermediate its ends is an arm 24 providing a support for an axle 26 about which a planet gear 28 is rotated and which carries planet gear 28 about its orbit. A sun gear 30 is integrally connected to the rotatable member 32 of a friction brake 34 and concentrically about member 32 is mounted a fixed friction member or band 36 capable of being tightly wrapped around member 32 to restrain rotation thereof. A ring gear 38 is rigidly connected to one member of one-way clutch 22 and to an output shaft 40. Also connected to output shaft 40 is a worm gear 42 engageable with a gear 44 which in turn drives a governor 46 through a shaft 48.

Governor 46, shown in detail in Fig. 4, actuates a switch arm 50 to operate a switch 52 controlling energization of a solenoid coil 54. Solenoid coil 54 upon energization thereof operates a plunger 57 to operate valve V, shown in detail in Fig. 2, reference to which is now had. Valve V receives plunger 57 in a housing 58 in one end thereof and receives a vacuum conduit 60 in its other end. A piston 62 integral with plunger 57 is normally urged away from the mouth of conduit 60 by a spring 64 to permit communication between a vacuum storage chamber 66 with valve V and simultaneously to close atmospheric vent 61. A check valve V/ck controls the vacuum of vacuum storage chamber 66 by communication with an evacuating means such as an intake manifold of an internal combustion engine through a conduit 68.

In the side of housing 58 and in communication with valve V is a conduit 70 in communication with diaphragmed chambers 72 and 74. A diaphragm 76 comprises one wall of chamber 72 and has connected thereto a rod 78, carrying a pair of spaced cam lobes 80 and 82 at the other end thereof. A spring 84 in chamber 72 normally urges diaphragm 76 outwardly of the chamber. In alternate engagement with lobes 80 and 82 and actuable thereby is a switch arm 86 for operating a switch 88. Chamber 74 is similar to chamber 72 and has a diaphragm 90 as one wall thereof. An arm 92 is connected to diaphragm 90 at one end thereof and to an ear 94 of brake band 36 at the other end. Another ear 94 of brake band 36 is fixedly secured to some suitable support as by an arm 96. A spring 98 is mounted so as to normally urge diaphragm 90 in one direction to cause engagement of brake band 36 with brake member 32.

Referring now to Fig. 3 for the electrical circuit of the magnetic clutch, there is shown the magnetic clutch coil 16, switch 88, a direct voltage source B and a switch S connected serially. Shunting switch 88 is a resistor 97 which is substituted for the short circuit of the switch at times to be described.

In another embodiment of the present invention shown in Fig. 5 a mechanical rather than vacuum operated switch is employed. The governor operated switch 52 energizes a motor such as motor 100 to actuate switch 88 and simultaneously to actuate brake band 36 as to engage brake member 32 by means of a nut and screw arrangement 102. A closed circuit is created by contact of a tongue 104 with either of contacts of switch 88 thereby energizing clutch coil 16.

The operation of the device shown in Figs. 1 through 4 is now explained. It is assumed that a power source such as an automotive engine is driving a load such as the drive wheels of an automobile and that the coupling in the drive system is in the low speed. Referring to Fig. 1 the drive in this case is through the magnetic clutch 10, shaft 20, one-way clutch 22, and through shaft 40 to the load. The band 36 is loose and disengaged from brake member 32. Under these conditions valve V in the vacuum circuit is open so as to provide communication with the vacuum storage chamber 66 and is closed to atmosphere and as a result the diaphragms of the respective diaphragmed chambers 72 and 74 are urged to their extreme vacuum actuated positions. Switch 88 is closed and therefore clutch coil 16 is energized. When the load attains sufficient speed so as to require a shift to second gear, governor 46, which is geared to output shaft 40, closes switch 52 rendering solenoid coil 54 energized through the closed circuit including switch 52, coil 54, direct voltage source B and ground. Solenoid core 56 is drawn more centrally into coil 54, plunger 57 is moved inwardly of valve V and piston 62 integral with plunger 57 overcomes the resistance of spring 64 and closes open end of conduit 60 to terminate the communication of vacuum storage tank 66 with the diaphragmed chambers. As plunger 57 moves inwardly, piston 62 unseats from the inner edge of aperture 61 admitting atmospheric pressure to the diaphragmed chambers through valve V and conduit 70 and seats against the end of vacuum conduit 60. The respective springs bearing against the diaphragms in chambers 72 and 74 urge the diaphragms and the arms attached thereto away from vacuum actuated position and in one case the movement momentarily opens switch 88 by disengaging cam lobe 82 from switch arm 86, that is, switch arm 78 momentarily rests between cam lobes 80 and 82. Momentary opening of switch 88 introduces resistor 97 into the clutch coil energization circuit as shown in Fig. 3 and disengages clutch 10 to the extent that resistor 97 diminishes current in coil 16. Clearly the power source is now to a large extent disengaged from the load and any shock or lurch that may result from application of a sudden load to the system as by engagement of friction brake 34 is avoided. Therefore, during the interval at which the magnetic clutch is partially disengaged, friction brake 34 is engaged by virtue of the movement of arm 92 to wrap band 36 about brake member 32. Rotation of member 32 and sun gear 30 integrally attached thereto provides for a rotation of ring gear 38 at a speed greater than that of shaft 20 due to the action of planetary gear 28 in a manner well known. After brake 34 is engaged, the movement of arm 78 continues so as to actuate switch arm 86 by engagement of cam lobe 80 therewith resulting in closure of switch 88 and full energization of magnetic clutch 10. The shift is at this stage completed with the magnetic clutch 10 and brake 34 engaged and the power source engaged to the load at a new gear ratio.

The operation of the pulsator shown in Fig. 5 is similar to that of the device in Figs. 1 through 4. Motor 100 is energized by closure of switch 52 in response to the action of governor 46 as pointed out with respect to Figs. 1 through 4, and screw 106 integral with the shaft of motor 100 actuates nut 102 so that tongue 104 is in engagement with either contact of switch 88 to energize clutch 10 during engagement of the power source with the load and so that tongue 104 is disengaged from the contacts of switch 88 during the interval that brake 34 is being engaged and magnetic clutch 34 is disengaged. Means (not shown) are provided to reverse motor 100 to return nut 102 when the entire system is deenergized.

It is to be understood that the foregoing disclosure of certain specific embodiments of invention is exemplary only and that the principle involved is susceptible of numerous other applications that will readily be apparent to persons skilled in the art. The invention, therefore, is limited only as indicated by the scope of the appended claims.

What I claim is:

1. A power drive system comprising a variably energizable clutch coupled between a power source and a load through a change speed means providing a plurality of gear ratios, a brake being engageable to alter the gear ratio between said source and said load, a governor responsive to the output of said change speed means, means operated by said governor and operatively connected to said clutch and said brake for controlling the deenergization of said clutch during intervals of initial engagement of said brake and for controlling engagement of said brake whereby shock or lurch in said power drive system is avoided due to quick engagement of said brake.

2. A power drive system according to claim 1 wherein said clutch is a magnetic clutch and said brake is of the friction type.

3. A power drive system according to claim 1 wherein said change speed means is a planetary gear set.

4. A power drive system according to claim 1 wherein said clutch is an electromagnetic clutch having an input member coupled to said power source and having an output member, a one-way clutch coupling said output member to the output of said drive system.

5. A power drive system comprising a magnetic clutch having an input member and a driven output member, an output shaft of a power system, a power source coupled to said input member, a one-way clutch coupled between said output member and said output shaft and a planetary gear set including a sun gear, a planet pinion carrier connected to said output member, a ring gear connected to said output shaft, a brake having a fixed member alternately engageable to restrict movement of said sun gear, means including a governor responsive to the speed of said output shaft for disengaging said clutch during intervals of initial engagement of said brake whereby jerk or shock of said load due to sudden engagement of said brake is avoided.

6. A power drive system according to claim 5 wherein said means coupling said governor to said clutches comprises a pair of diaphragmed vacuum chambers wherein movement of one of said diaphragms actuates said brake and movement of the other of said diaphragms actuates switch means for controlling energization of said magnetic clutch.

7. A power drive system according to claim 6 including a vacuum storage tank and valve means for controlling communication between said chambers and said vacuum storage tank whereby controlled vacuum is provided in said chambers, said valve being opened by said governor at a predetermined speed of said output shaft.

8. A power drive system according to claim 5 wherein said means coupling said governor to said clutches comprises switch means actuated by said governor for controlling energization of a motor, further switch means actuated by said motor and having a member between stationary contacts of said switch for intermittent electrical contact therewith, said motor simultaneously actuating the engageable memeber of said friction clutch.

9. A power drive system comprising a pair of clutches coupled between a power source and a load, a brake engageable to alter the speed of said load, a motor, a governor responsive to the speed of said load, means operated by said governor for controlling energization of said motor, means in driving relationship with said motor and operatively connected to one of said clutches and said brake for energizing said one of said clutches intermittently and in varying amounts and for simultaneously actuating said brake during intervals of lesser energization of said one clutch whereby coupling between said power source and said load is diminished during intervals of initial engagement of said brake to minimize shock or lurch of said load.

References Cited in the file of this patent

UNITED STATES PATENTS

| | | |
|---|---|---|
| 2,174,672 | Von Soden-Fraunhofen | Oct. 3, 1939 |
| 2,241,334 | Stucatur | May 6, 1941 |
| 2,479,532 | Wemp | Aug. 16, 1949 |
| 2,585,437 | Claytor | Feb. 12, 1952 |

FOREIGN PATENTS

| | | |
|---|---|---|
| 448,356 | Great Britain | June 8, 1936 |
| 509,962 | Great Britain | July 25, 1939 |